(12) United States Patent
Prebeck

(10) Patent No.: US 10,443,710 B2
(45) Date of Patent: Oct. 15, 2019

(54) POWERTRAIN OF A VEHICLE

(71) Applicant: ZF Friedrichshafen AG, Friedrichshafen (DE)

(72) Inventor: Stefan Prebeck, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/865,448

(22) Filed: Jan. 9, 2018

(65) Prior Publication Data

US 2018/0202540 A1    Jul. 19, 2018

(30) Foreign Application Priority Data

Jan. 13, 2017  (DE) .................. 10 2017 200 528

(51) Int. Cl.
| | |
|---|---|
| *G01L 3/10* | (2006.01) |
| *F16H 61/00* | (2006.01) |
| *F16H 61/662* | (2006.01) |
| *F16H 59/14* | (2006.01) |

(52) U.S. Cl.
CPC ......... *F16H 61/0003* (2013.01); *F16H 59/14* (2013.01); *F16H 61/6625* (2013.01); *G01L 3/101* (2013.01); *B60Y 2300/1888* (2013.01); *B60Y 2300/58* (2013.01); *B60Y 2400/307* (2013.01); *F16D 2500/7048* (2013.01); *F16H 2059/147* (2013.01); *F16H 2061/0012* (2013.01)

(58) Field of Classification Search
CPC ... G01L 3/04; G01L 3/101; F16H 2061/0012; F16H 61/0003; F16H 61/6625; F16D 2500/7048

USPC .................................................... 73/862.191
See application file for complete search history.

(56) References Cited

U.S. PATENT DOCUMENTS

| | | | |
|---|---|---|---|
| 4,450,729 A | 5/1984 | Troeder et al. | |
| 6,336,879 B1 * | 1/2002 | Schmid | ............... F16H 55/56 474/18 |
| 6,483,197 B1 * | 11/2002 | Masberg | ............... B60K 6/26 290/40 C |
| 7,478,572 B2 | 1/2009 | Maten et al. | |
| 7,635,317 B2 * | 12/2009 | Petzold | ............... B60W 50/029 477/115 |
| 7,813,857 B2 * | 10/2010 | Mizon | ............... B60K 23/0808 192/54.1 |

(Continued)

FOREIGN PATENT DOCUMENTS

| | | |
|---|---|---|
| DE | 3112714 C1 | 11/1982 |
| DE | 102007008750 A1 | 9/2007 |

(Continued)

OTHER PUBLICATIONS

German Search Report issued in corresponding German Patent Application No. 10 2017 200 528.9 dated Dec. 15, 2017.

*Primary Examiner* — Octavia Hollington
(74) *Attorney, Agent, or Firm* — Davis & Bujold PLLC; Michael J. Bujold

(57) ABSTRACT

A drive-train of a vehicle which at least includes a drive motor (1) and a transmission (2). The drive-train has at least one torque sensor (6, 6A) which is provided for the purpose of controlling a drive component of the drive-train. The torque sensor (6, 6A) is integrated in a transmission component in order to determine, at the time, the torque applied to the transmission component.

14 Claims, 2 Drawing Sheets

(56) References Cited

U.S. PATENT DOCUMENTS

| | | | |
|---|---|---|---|
| 7,901,321 B2* | 3/2011 | Ferrier | F16H 61/143 |
| | | | 477/64 |
| 8,352,140 B2* | 1/2013 | Herter | B60W 30/20 |
| | | | 701/67 |
| 8,695,567 B2 | 4/2014 | Javaherian et al. | |
| 9,285,282 B2 | 3/2016 | Kapas et al. | |
| 9,733,138 B2* | 8/2017 | Pietron | G01L 3/103 |
| 2008/0194382 A1* | 8/2008 | Petzold | F16D 48/02 |
| | | | 477/86 |
| 2016/0061674 A1* | 3/2016 | Gieibl | G01L 3/102 |
| | | | 73/862.333 |

FOREIGN PATENT DOCUMENTS

| | | |
|---|---|---|
| DE | 102011116969 A1 | 5/2012 |
| DE | 102014202735 A1 | 8/2014 |

\* cited by examiner

POWERTRAIN OF A VEHICLE

This application claims priority from German patent application serial no. 10 2017 200 528.9 filed Jan. 13, 2017.

FIELD OF THE INVENTION

The present invention concerns a power-train of a vehicle having at least a drive motor and a transmission.

BACKGROUND OF THE INVENTION

From automotive technology it is known that torque sensors are used for determining the applied torque for controlling the drive motor. As sensors for determining the torque, for example magneto-elastic sensors can be used. Such sensors are used for example in E-bikes or for driving in vehicles with active steering. Moreover, torque sensors are used on the crankshaft for controlling the drive motor in vehicles.

It has been shown that when torque sensors are used in vehicles, it is a disadvantage for the torque sensor to be fitted into the vehicle as an additional component. This disadvantageously increases not only the manufacturing costs but also the fitting space required.

SUMMARY OF THE INVENTION

The purpose of the present invention is to propose a power-train of a vehicle of the type described to begin with, in which torque sensors are provided in as simply designed and fitting-space-neutral a manner as possible.

According to the invention, this objective is achieved by the characteristics specified in the independent claims, while advantageous further developments emerge from the subordinate claims, the description and the drawings.

Thus, a power-train of a vehicle with at least a drive motor and a transmission is proposed, in which at least one torque sensor is provided for control purposes. To accommodate the torque sensor in the proposed power-train in a simply designed and fitting-space-neutral manner, it is provided that the torque sensor for determining the torque applied at the time is integrated in an already existing transmission component.

In this way, in the proposed power-train at least one torque sensor is integrated in a simply designed manner whereby, by determining the torque applied at the time between the input and the output of the transmission, optimum drive motor and transmission management is made possible. Thanks to the advantageous integration of the torque sensor in an already present transmission component, not only are the manufacturing costs substantially reduced but also there is considerable savings of the fitting space required in the power-train proposed according to the invention.

In the context of further embodiments of the present invention, the integrated torque sensor can be integrated at the transmission input, at the transmission output or even in the transmission itself, for example in transmission components present in the transmission housing. For the management of the transmission, integration of the torque sensor for example in an existing vibration damper or in an existing torque transmission device such as a starting element or the like is particularly advantageous.

When the vehicle is a working machine such as a tractor or the like, then by integrating the torque sensor into an existing front axle drive or in an existing power take-off, by virtue of the then available additional torque values, an exact power management system for the powertrain can be realized.

For example, in hybrid vehicles or vehicles in which various engine powers can be activated via a CAN, the power-train according to the invention can contribute advantageously to a so-termed boost strategy of the combustion engine drive and the hybrid drive to ensure the optimum workload of the drive components.

Depending on the number of integrated torque sensors used and the preferable use of calculation algorithms for determining the torque, particularly for vehicles with power take-offs there exist highly accurate and inexpensive control strategies.

By virtue of the proposed integration of torque sensors not only in vibration dampers but also in torque transmission elements or devices, such as starting clutches, turbo-clutches, torque converters or the like, further improvements can be achieved in relation to the control of the drive motor and the transmission.

The integration of torque sensors in vibration dampers or torque transmission devices such as clutches is simple to design, since the existing elastic plates of the transmission component can be designed as an integrated torque sensor, in order thereby to be able to measure torques for example with magneto-elastic sensors (Villari effect), which can be used particularly simply as torque sensors. In this way the torque on the transmission components at the time can be determined precisely and used appropriately for the optimized control.

BRIEF DESCRIPTION OF THE DRAWINGS

Below, the present invention is explained in more detail with reference to the drawings, which show.

DETAILED DESCRIPTION OF THE PREFERRED EMBODIMENTS

Figure 1:
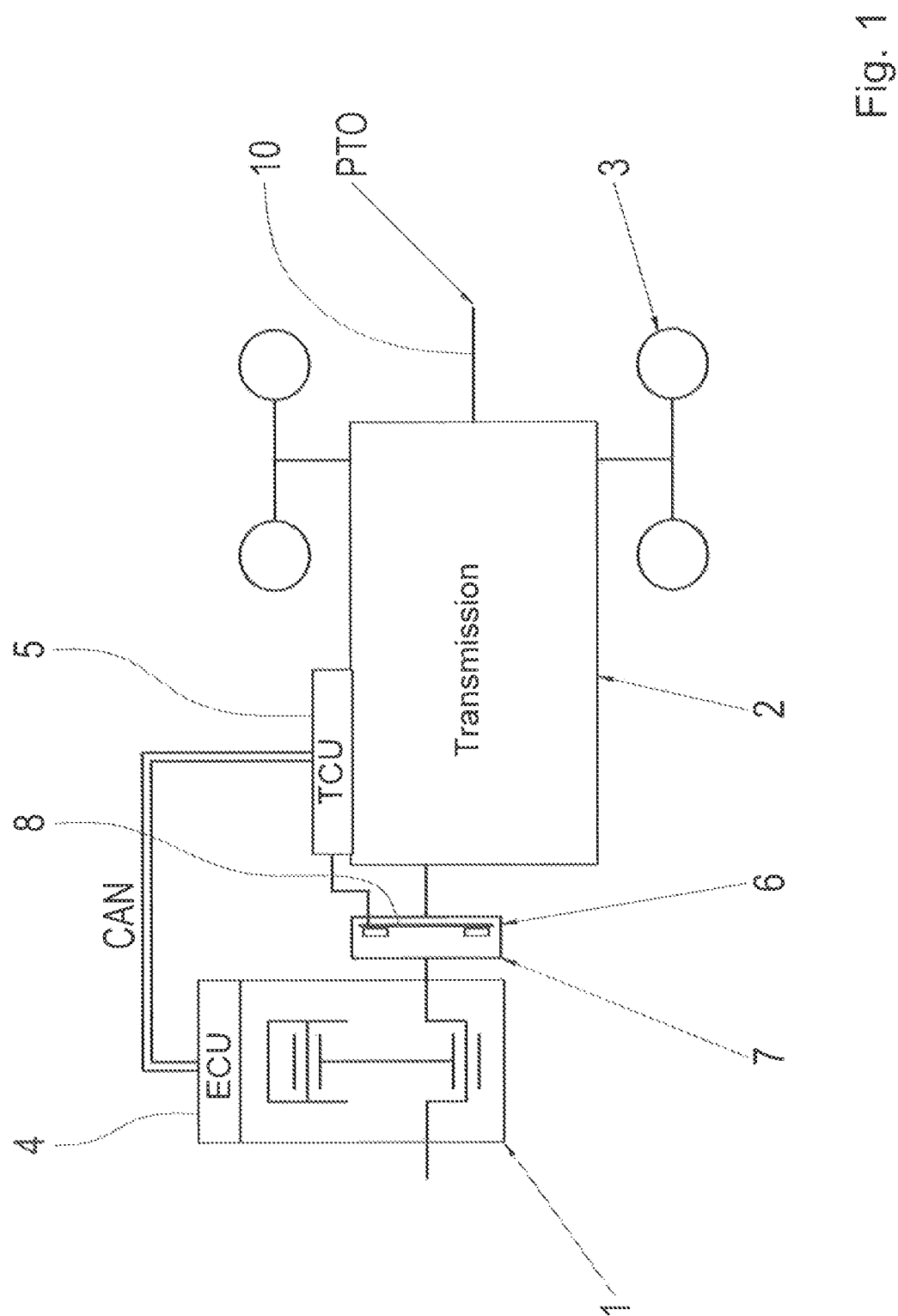
FIG. 1: A schematic view of a first embodiment of a power-train according to the invention, with a torque sensor integrated in a vibration damper.
Figure 2:
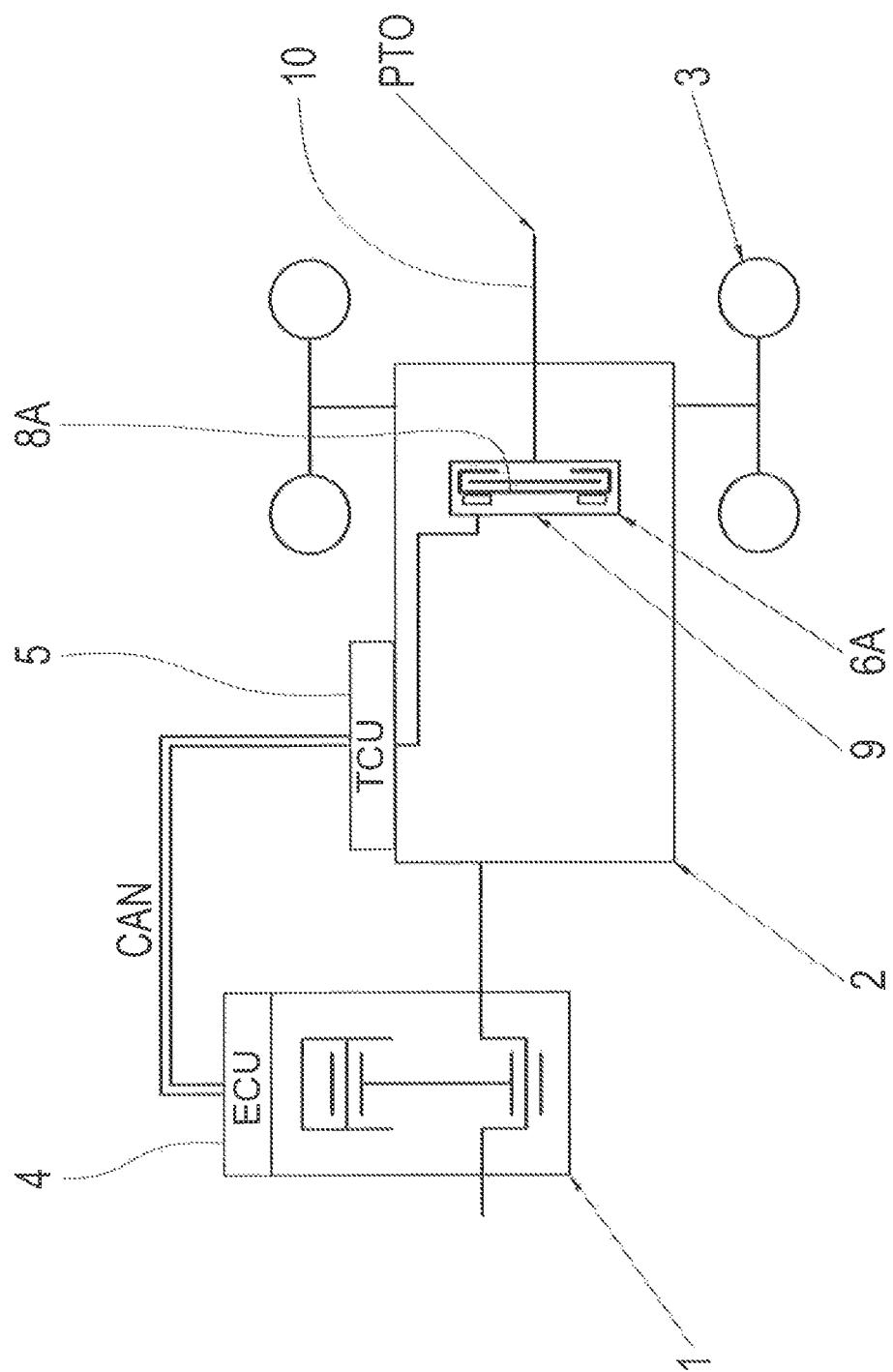
FIG. 2: A schematic view of a second embodiment of the power-train according to the invention, with a torque sensor integrated in a clutch of a power take-off.

FIGS. 1 and 2 show as examples different embodiments of a power-train according to the invention, which can even be combined with one another According to the invention, it is provided that in the proposed power-train with at least a drive motor 1 and a transmission 2, at least one torque sensor 6, 6A is integrated in an existing transmission component for determining the torque applied at the time. By virtue of the integration of the torque sensor 6, 6A for example in an already existing flexible plate or disk 8, 8A of the transmission component, no additional components are needed and accordingly not only the manufacturing costs but also the fitting space required are reduced.

A further aspect of the invention relates to the position in which the integrated torque sensor 6, 6A is arranged in the power-train. By integrating the torque sensor in the area of the transmission 2 between the transmission input and the transmission output, the torques determined for the control of the motor 1 and the transmission 2 are qualitatively improved. In that way, with the torques determined not only improved transmission management but also a particularly precise power management system for the vehicle can be realized.

For example, when a hybrid vehicle is provided with the power-train, an improved boost strategy is also available for the combustion engine and the electric drive to ensure an optimum workload of the drive components in the proposed power-train.

Independently of the embodiments shown in FIGS. 1 and 2, the power-train according to the invention comprises the drive motor 1, which in the figures is represented, for example, as an internal combustion engine. In addition the transmission 2 coupled with the drive motor 1 is also shown, which is connected to the drive output 3 of the vehicle. Furthermore, an engine control unit (ECU) 4 is connected to a transmission control unit (TCU) 5 by way of a CAN vehicle network.

FIG. 1 shows a proposed power-train in which the torque sensor 6 is integrated in a vibration damper 7 in the form of an existing flexible plate 8 of the vibration damper 7. In this way the torque values determined can be passed on by the torque sensor 6 integrated in the vibration damper 7, for example to the transmission control unit 5, in order to further improve the management of the drive motor and the transmission. Thus, in this first embodiment the torque sensor 6 is integrated in the vibration damper 7 at the transmission input.

FIG. 2 shows a second embodiment of the power-train according to the invention. In this second embodiment the torque sensor 6A is integrated in an already present elastic plate 8A of an existing transmission component in the form of a torque transmission device. In the second embodiment, as the torque transmission device, a clutch 9 on a drive output shaft 10 of a power take-off PTO is shown. In this case, the clutch 9 is arranged as a transmission component in the housing of the transmission 2. Consequently, in the second embodiment the torque sensor 6A is integrated in a transmission component which is in the transmission 2. In this design too, the integrated torque sensor 6A is connected to the transmission control unit 5 for the transmission of electrical data. The power take-off PTO is preferably provided in vehicles designed as working machines.

The embodiments shown should be regarded only as examples, since the integrated torque sensor 6, 6A can likewise be integrated in other transmission components already present in the power-train. These can be for example a starting clutch, a turbo-clutch, a torque converter, a front-axle drive or suchlike.

INDEXES

1 Drive motor
2 Transmission
3 Vehicle drive output
4 Engine control unit
5 Transmission control unit
6, 6A Integrated torque sensor
7 Vibration damper
8, 8A Flexible plate
9 Clutch
10 Drive output shaft
PTO Power take-off
CAN Vehicle network

The invention claimed is:

1. A drive-train of a vehicle with at least a drive motor and a transmission having an input and an output, at least one torque sensor being provided for determining torque, and the torque sensor being connected to an electronic transmission control unit and being integrated in a first transmission component for determining the torque which is applied at the first transmission component, between the input and the output of the transmission, and the transmission control unit controlling the transmission based on the torque applied at the first transmission component.

2. The drive-train according to claim 1, wherein an existing flexible plate of the first transmission component is designed as the integrated torque sensor.

3. The drive-train according to claim 1, wherein the integrated torque sensor is a magneto-elastic sensor for determining the torque applied to the first transmission component.

4. The drive-train according to claim 1, wherein the first transmission component with the torque sensor integrated therein is associated with a transmission input.

5. The drive-train according to claim 1, wherein a further transmission component is provided with a further integrated torque sensor, the further transmission component is a vibration damper which is arranged between the drive engine and the transmission, the further integrated torque sensor determining torque applied at the vibration damper, and the further integrated torque sensor being connected to the transmission control unit which controls the transmission based on the torque applied at the first transmission component and the vibration damper.

6. The drive-train according to claim 1, wherein the first transmission component provided with the integrated torque sensor is at least one of a starting clutch, a turbo-clutch, and a torque converter.

7. The drive-train according to claim 1, wherein the first transmission component integrated with the torque sensor is arranged in a housing of the transmission.

8. The drive-train according to claim 7, wherein the first transmission component provided with the integrated torque sensor is a clutch on a drive output shaft of a power take-off.

9. The drive-train according to claim 1, wherein the first transmission component provided with the integrated torque sensor is a torque transmission device of a front axle drive.

10. The drive-train according to claim 1, wherein the vehicle is a working machine.

11. A drive-train of a vehicle, the drive-train comprising:
a drive motor,
a transmission, having a transmission housing, an input and an output, and
at least one clutch being arranged within the transmission housing,
the at least one clutch having a flexible plate with a magneto-elastic sensor integrated hi the flexible plate for determining torque applied between the input and the output of the transmission,
the magneto-elastic sensor being connected to a transmission control unit for receiving torque values, the torque values being transmitted by the magneto-elastic sensor to the transmission control unit, and managing operation of at least the transmission based on the received torque values.

12. The drive-train according to claim 11, wherein the transmission control unit is connected to an engine control unit which receives the torque values from the transmission control unit such that the transmission and the engine control unit controls operation of the transmission and the drive motor, respectively, based on the torque values.

13. The drive-train according to claim 12, wherein the at least one clutch is a clutch connected to a drive output shaft of a power take-off.

14. The drive-train according to claim 11, wherein the at least one clutch is a torque transmission device of a front axle drive.

* * * * *